United States Patent [19]

Daley et al.

[11] 3,928,547

[45] Dec. 23, 1975

[54] PROCESS FOR THE REDUCTION OF SULFUR DIOXIDE

[75] Inventors: William D. Daley, Morristown; John E. Wilkalis, Morris Plains; Wim J. M. Pieters, Morristownship, all of N.J.

[73] Assignee: Allied Chemical Corporation, New York, N.Y.

[22] Filed: June 10, 1974

[21] Appl. No.: 477,893

Related U.S. Application Data

[63] Continuation-in-part of Ser. No. 267,863, June 30, 1972, abandoned.

[52] U.S. Cl.................................. 423/564; 423/570
[51] Int. Cl.$^2$......................................... C01B 17/04
[58] Field of Search ............ 423/569, 570, 574, 564

[56] References Cited

UNITED STATES PATENTS

| | | | |
|---|---|---|---|
| 1,840,076 | 1/1932 | Bacon | 423/570 |
| 2,090,217 | 8/1937 | Merriam | 423/570 |
| 3,640,682 | 2/1972 | Smith et al. | 423/573 X |
| 3,653,833 | 12/1969 | Watson | 423/570 |
| 3,755,551 | 8/1973 | Bridwell et al. | 423/570 |
| 3,764,665 | 10/1973 | Groendaal | 423/570 X |

*Primary Examiner*—G. O. Peters

[57] ABSTRACT

This invention relates to the reduction of sulfur dioxide to elemental sulfur wherein a feed mixture of a sulfur dioxide-containing gas and a hydrocarbon reducing agent is reacted at elevated temperatures in the presence of minor amounts of elemental sulfur.

17 Claims, No Drawings

PROCESS FOR THE REDUCTION OF SULFUR DIOXIDE

RELATED APPLICATIONS

This application is a continuation-in-part application of U.S. application Ser. No. 267,863, filed June 30, 1972 now abandoned.

BACKGROUND OF THE INVENTION

Sulfur dioxide ($SO_2$) is found in a great many industrial gases emanating from plants involved in roasting, smelting and sintering sulfide ores, such as chalcopyrite ($CuFeS_2$), iron pyrites ($FeS_2$) or pyrrhotite ($Fe_7S_8$), or gases from power plants burning high sulfur coal or fuel oils or other sulfurous ores or other industrial operations involved in the combustion of sulfur-bearing fuels, such as fuel oil, and refineries. As can be readily appreciated, the emission of $SO_2$ in these gases presents not only a health hazard by contaminating the surrounding atmosphere, but results in loss of valuable sulfur values. One of the more difficult environmental problems facing industry is how to economically control these $SO_2$ emissions. This problem is especially critical to electric utilities and non-ferrous ore-smelting industries which represent large single-point emission sources and account for a major portion of total $SO_2$ emissions.

Most development work on this problem has been directed towards neutralizing the $SO_2$ or converting it to sulfuric acid. While it has previously been proposed to produce elemental sulfur from gases containing $SO_2$, there have been developed very few commercially feasible processes for the reduction of sulfur dioxide to elemental sulfur. The reduction of sulfur dioxide has been investigated extensively over a period of many years and there has been a myriad of references published on the subject. For instance, the basic $SO_2$ reduction process using a hydrocarbon reducing agent is disclosed and discussed in Yushkevich et al, Article ZH. KHIM. PROM., No. 2, pages 33–37 (1934). In this article the authors discuss in detail the various possible reaction products which may be produced, including carbon dioxide, water, hydrogen, carbon monoxide, hydrogen sulfide, carbonyl sulfide, carbon disulfide and sulfur, depending upon temperature, flow rates of reactants and ratio of reactants employed. Based on experiments conducted by Yushkevich et al, they concluded that the reduction of $SO_2$ with methane is best conducted at temperatures of 900° to 1,000°C. (1,652° to 1,832°F.). At lower temperatures, i.e. 800°C. (1,472°F.) the authors report that substantial amounts of unreacted methane remain in the product gas mixture. As can be appreciated, when space velocities of the reactants which enter into the reaction are decreased (i.e. contact time increased), larger size process equipment would have to be employed for the same amount of gas treated thereby substantially increasing the capital cost of a commercial plant.

Additionally, in U.S. Pat. Nos. 2,270,427; 2,388,259 and 2,431,236, the reduction of sulfur dioxide with a hydrocarbon reducing gas, such as methane, is described wherein the sulfur values are recovered in an essentially three-step reaction. In the first step the reduction of sulfur dioxide contained in the off-gases from smelting operations is reacted with methane over a refractory surface at temperatures approximating 2,200° to 2,400°F. The chief sulfur-containing by-products are carbonyl sulfide and hydrogen sulfide. The carbonyl sulfide is then reacted with additional sulfur dioxide at temperatures of about 800° to 840°F. over a catalyst, such as bauxite, to produce sulfur and the hydrogen sulfide in the product stream is reacted with still further amounts of sulfur dioxide at temperatures of about 410° to 450°F. in the presence of a catalyst, such as bauxite, to produce sulfur by the well-known Claus reaction.

Likewise, in U.S. Pat. No. 3,199,955, a similar system is disclosed employing three catalytic steps to convert the sulfur dioxide to elemental sulfur by the reduction of sulfur dioxide with a hydrocarbon reducing agent, such as methane, at temperatures in the order of 1,470° to 1,830°F. in the presence of a catalyst, such as activated alumina, bauxite, calcium sulfide and quartz. This patent reports that about 40 to 60 percent of the inlet sulfur dioxide appears in the product gases from the first step as elemental gaseous sulfur, the remainder is found as hydrogen sulfide, carbonyl sulfide, carbon disulfide and sulfur dioxide. The remaining two steps of the process described in this patent are essentially identical to the processing steps described in the above referred-to patents. The patentees take elaborate steps to assure that the temperature in the reduction reaction zone remains below about 1,000°C. (1,832°F.), by the use of more than a single reactor since a single reactor will not permit holding the temperatures below the desired 1,000°C. level. The patentees provide a second reactor wherein the gases from the first reactor pass to the second and in this manner it is reported that temperatures below 1,000°C. are maintained.

As noted above, the major problem with the processes described in these patents is the necessary high equipment cost to be used to carry out the primary reaction step as well as the intermediate reaction step of converting the carbonyl sulfide and/or carbon disulfide to additional sulfur. Desirably, the reduction of sulfur dioxide with a hydrocarbon reducing agent should be conducted in as few pieces of conventional equipment as possible and produce as few by-products as possible which require further treatment or reaction. Additionally, the reduction of sulfur dioxide using a hydrocarbon reducing agent initiated at temperatures from 1,400°F. and above and the need to control the maximum temperature reached during the reduction reaction require the use of special catalytic materials that can withstand prolonged exposure to these high temperatures as well as sudden increases in the reaction temperature without adversely affecting the activity of the catalyst. These high initiation temperatures and sudden increase in temperature during the reaction also require additional consideration to the type of equipment which may be employed and the materials of construction. Since the reduction reaction is highly exothermic (corresponding to an adiabatic temperature rise in the reactor of about 200° to 750°F depending on the strength of the $SO_2$-containing gas), the prior art process designs capitalize on the use of heat exchanging the product gas with the feed gas to attain the required reaction initiation temperatures. However, this is not feasible because of materials of construction problems in the heat exchanger. In standard heat exchangers the practical upper limit of heat exchanger temperature for $SO_2$-containing gases is generally in the range of about 1,000° to 1,200°F. Because the prior art processes require initiation temperatures upwards of 1,400°F, the use of either pebble-bed-type heat exchangers, or alternatively, the application of supplementary heat from in-line heaters or furnaces have been resorted to.

PRESENT INVENTION

It has now been found that when a small amount of elemental sulfur is present at the initiation of the reduction of a sulfur dioxide-containing gas with a hydrocarbon reducing agent, the temperature required for initiation of the reduction reaction is reduced. That is, in the presence of sulfur during the initiation of the reduction reaction, the temperature normally required to initiate the reduction of sulfur dioxide with a hydrocarbon reducing agent, such as methane, have been found to be reduced by at least about 50°F, preferably at least about 100°F below the temperature at which initiation of the reduction reaction is effected in the absence of said sulfur. Generally, the initiation temperature of the reduction reaction when a small amount of sulfur is present has been found to be from about 850° to 1,300°F. In addition to the reduction of the initiation temperature it has been found that with the presence of sulfur during the reduction reaction, particularly of $SO_2$-containing gases having a high concentration of sulfur dioxide, such as 50 percent or more, the reaction is permitted to proceed smoothly to completion in a commercially acceptable manner, rather than an extremely rapid reaction once the initiation temperature has been reached wherein the chemical conversion of the $SO_2$ becomes increasingly rapid to the point of being violent. That is, the presence of sulfur has been found to moderate the rate of temperature rise during the reduction reaction to within desirable limits. Also, in the presence of sulfur it has been found that the maximum temperature reached in the reduction reactor is lower than when the reduction is carried out in the absence of sulfur. Further, it has been found that when the reaction is permitted to go to completion the reductant efficiency is increased when sulfur is present in the reaction mixture, i.e., there are lower concentrations of carbon monoxide and hydrogen in the product gases. Still further, it has been found that in the presence of sulfur and at a given inlet temperature the time within which the reduction reaction is completed is less than when no sulfur is present, thus permitting the use of a reactor within which the reduction reaction is carried out to be sized substantially smaller than when no sulfur is present. As noted above, by being able to initiate the reduction reaction at lower temperatures than previously, commercially attractive sulfur dioxide reduction processes may be designed and utilized incorporating conventional type heat exchangers and catalytic materials.

The amount of sulfur which should be present at initiation of the reduction reaction of the sulfur dioxide and the hydrocarbon reducing agent may range from about 0.05 to 3 mol percent, preferably about 0.1 to 1.5 mol percent, expressed as $S_8$, of the feed gas. While higher than 3 mol percent may be employed, there would be no additional benefits than those specified. The sulfur is present in the form of elemental sulfur vapor which may be produced by the process and is easily recycled and may be added to the sulfur dioxide gas and/or hydrocarbon reducing agent. While the product gas exiting from the reactor, which may contain elemental sulfur, hydrogen sulfide, unreacted sulfur dioxide and other gaseous sulfur compounds, such as carbonyl sulfide and carbon disulfide, as well as carbon dioxide, water vapor and nitrogen may be utilized, this is not preferred because there is an appreciable increase in the volume of the gas mixture of the sulfur dioxide-containing gas and reducing agent resulting in larger volumes of process gas to be handled with concomitant increase in equipment requirements.

In the operation of the present process, the temperatures which may be employed in the reduction of sulfur dioxide-containing gas with a hydrocarbon reducing agent in the presence of the elemental sulfur are within the range of about 850° to 2,400°F, preferably about 950° to 2,000°F. Preferably, the reduction reaction is carried out in the presence of a catalyst. In a preferred embodiment of the present invention the catalytic material is typically in the form of small balls, pebbles, pellets or granules. Any of the well-known catalysts previously employed for the reduction of sulfur dioxide may be used, such as bauxite, alumina, silica, calcium sulfide, vanadium oxides, calcium aluminate and combinations thereof. As hydrocarbon reducing agents, the normally gaseous hydrocarbons are preferred and contain from 1 to 4 carbon atoms. Such reducing agents include natural gas, which is a mixture comprising methane, ethane, propane the butanes, the pentanes, nitrogen and carbon dioxide; methane, ethane, propane and the butanes. Additionally, higher hydrocarbons may be employed if under the reaction conditions they are in the gaseous condition.

The sulfur dioxide which is reduced in the present process may be essentially pure or it may comprise a small percent, as in an industrial waste gas, wherein the sulfur dioxide content may vary from less than about 1 up to 100 percent with the other components comprising essentially oxygen, nitrogen, carbon dioxide and water vapor. In general, the smelter gases contain approximately 2 to about 16 percent by volume sulfur dioxide and these gases can be conveniently handled in the process of the present invention. However, emissions from utility stack gases generally contain less than 1 and more likely contain less than ½ percent by volume sulfur dioxide and the processing of the sulfur dioxide to elemental sulfur from such stack gases is considered uneconomical unless such sulfur dioxide content is upgraded. There are available a number of sulfur dioxide recovery processes wherein the sulfur dioxide emissions are recovered in the form of a more concentrated gas, generally in excess of about 10% $SO_2$ by volume, and may range upwards in $SO_2$ concentration to 100% $SO_2$ by volume, dry basis. Typical of these recovery processes are the so-called "regenerative alkaline" processes wherein an alkaline agent such as sodium sulfite, ammonium sulfite, metal carbonate or magnesium dioxide strip the $SO_2$ from the flue gas stream by combining chemically with the sulfur dioxide. In a separate generation step the agent is reconstituted and a sulfur dioxide gas is recovered. Other processes are the so-called "regenerative solid adsorption" processes wherein a sulfur adsorber, such as activated-char or activated carbon, adsorbes the $SO_2$ from the $SO_2$ gas stream. Also, there are so-called "regenerative organic" processes which differ from the alkaline regenerative absorption processes in that an organic absorbing medium is used to absorb the $SO_2$. The $SO_2$ may then be removed from the organic solvent and processed according to the present invention.

As noted above, the reduction of sulfur dioxide with a hydrocarbon reducing agent is conducted at elevated temperatures between about 850° to 2,400°F, preferably 950° to 2,000°F. If a catalyst is employed, contact times of about 0.1 to 7 seconds, preferably about 0.25 to 5.0 seconds may be employed. At contact times of less than 0.1 second, conversion is incomplete. At contact times greater than 7 seconds, the reaction vessel diameter becomes too large or the reactor bed depth too great to be practical.

The reduction of sulfur dioxide in the present process employing a hydrocarbon reducing agent, preferably natural gas or methane, is carried out to achieve maximum conversion using an amount of reducing gas sufficient to convert the sulfur dioxide to elemental sulfur and hydrogen sulfide with only trace amounts of other sulfur-containing gases and preferably a molar ratio of hydrogen sulfide to sulfur dioxide in the product gas stream of about 2:1. The molar ratio of reactants (sulfur dioxide:reducing gas) should be from about 1.33 and up to about 6.5:1, depending upon the reducing gas employed. For instance, if butane is used a ratio of sulfur dioxide to butane is 4.5:1 to 6.5:1. If the reducing agent is methane, the ratio of sulfur dioxide to reducing gas should be from about 1.33:1 to 2.0:1 with an especially preferred ratio of sulfur dioxide:reducing gas of 1.7 to 1.99:1. Under the above recited processing conditions using methane as a reducing agent, at ratios at and below 1.33:1 and at ratios at and above 2.0:1 the desired 2:1 molar ratio of $H_2S:SO_2$ in the product gas is not achieved. Further, at ratios below 1.33:1, the product gas stream may contain unreacted methane and/or methane by-products, such as hydrogen and carbon monoxide. Under these conditions maximum conversion is achieved thereby giving maximum utilization of the hydrocarbon reducing agent and only small amounts of unreacted carbon monoxide and hydrogen appear in the exit gases. Furthermore, only trace amounts of carbonyl sulfide and carbon disulfide are detected in the product gas, thereby permitting the use of a single reduction vessel preceding the conventional Clause reactor for converting the hydrogen sulfide in the product gases to additional sulfur by reaction with sulfur dioxide. The product gases leaving the reduction system pass through a sulfur condenser and then into a conventional Claus converter wherein the hydrogen sulfide formed in the reduction reaction reacts with residual sulfur dioxide in the product stream to produce additional amounts of elemental sulfur. As noted above, in order to provide the sulfur values in the reduction reaction, the sulfur product may be condensed and then the desired amount of sulfur vaporized and recycled to the feed stream for utilization in the reduction reaction.

The equipment which may be employed in the reduction of sulfur dioxide in the process of the present invention may be that conventionally employed for the contacting of gases with catalytic material. Typical of the type of equipment for reducing $SO_2$ are disclosed in the aforementioned U.S. Pat. Nos. 2,270,427; 2,388,259; 2,431,236 and 3,199,955 and U.S. Pat. No. 3,653,833.

In order to better understand the operation of the present process the following examples are offered:

EXAMPLES 1–3

A series of runs are conducted in a reaction vessel in which a sulfur dioxide-containing gas of varying sulfur dioxide concentrations is reacted with methane in the presence of a reducing catalyst. The reaction vessel employed is an adiabatic fixed bed reactor having an inlet and outlet and may have means provided for the introduction of a portion of the feed gas into an intermediate region of the reactor system which permits better temperature control during the reduction reaction. The void space in the catalyst bed is about 40 percent. Reference is made to the following tables, Tables I, II and III, which set forth pertinent data including feed gas compositions, reaction conditions, such as catalyst composition, contact times, residence times, reactor inlet and reactor exit temperatures, and product gas stream composition. In those runs wherein sulfur is present at initiation of the reduction reaction it amounts to about 1 mol percent, expressed as $S_8$, which consists of an equilibrium mixture of elemental sulfur in the forms $S_2$, $S_6$ and $S_8$.

TABLE I

Example 1 -Series 1 (Sulfur Present)

| A. Feed Gas Composition[1] | Run A | Run B | Run C | Run D |
|---|---|---|---|---|
| $SO_2$ | 59.30 | 59.29 | 59.29 | 59.29 |
| $CH_4$ | 30.24 | 30.24 | 30.24 | 30.24 |
| $H_2O$ | 6.59 | 6.59 | 6.59 | 6.59 |
| Sulfur[2] as | | | | |
| $S_2$ | 3.851 | 3.877 | 3.883 | 3.884 |
| $S_6$ | .006 | .002 | .001 | — |
| $S_8$ | .004 | .001 | — | — |
| Nitrogen | — | — | — | — |
| Ratio $SO_2/CH_4$ | 1.96 | 1.96 | 1.96 | 1.96 |
| B. Reaction Conditions | | | | |
| Catalyst: | Activated Alumina | Activated Alumina | Activated Alumina | Activated Alumina |
| Reactor Inlet Temperature °F. | 1050° | 1100° | 1150° | 1200° |
| Reactor Exit Temperature °F. | 1796° | 1810° | 1857° | 1895° |
| Actual residence time in reactor at time of essentially complete methane utilization, seconds | 3.87 | 2.0 | 1.06 | 0.57 |

[1]Moles
[2]Sulfur in the form of $S_2$ $S_6$ and $S_8$ at 1000°F., amounting to about 1 mol percent as $S_8$ Example 1

| A. Feed Gas Composition | Series 2 (No Sulfur Present) | | | |
|---|---|---|---|---|
| | Run E | Run F | Run G | Run H |
| $SO_2$ | 61.68 | 61.68 | 61.68 | 61.68 |
| $CH_4$ | 31.46 | 31.46 | 31.46 | 30.46 |

Example 1-continued

Series 2 (No Sulfur Present)

| A. Feed Gas Composition | Run E | Run F | Run G | Run H |
|---|---|---|---|---|
| $H_2O$ | 6.86 | 6.86 | 6.86 | 6.86 |
| Sulfur as | | | | |
| $S_2$ | — | — | — | — |
| $S_6$ | — | — | — | — |
| $S_8$ | — | — | — | — |
| Nitrogen | — | — | — | — |
| Ratio $SO_2/CH_4$ | 1.96 | 1.96 | 1.96 | 1.96 |
| B. Reaction Conditions | | | | |
| Catalyst: | Activated Alumina | Activated Alumina | Activated Alumina | Activated Alumina |
| Reactor Inlet Temperature °F. | 1050° | 1100° | 1150° | 1200° |
| Reactor Exit Temperature °F. | —(3) | 1820° | 1870° | 1904° |
| Actual residence time in reactor at time of essentially complete methane utilization, seconds | — | 2.80 | 1.54 | 0.87 |

(3)After 4 seconds the temperature had only reached 1160°F and only about 7.9 mol percent of the $SO_2$ had been reduced.

Example 2

| A. Feed Gas Composition | Run A | Run B | Run C | Run D | Run E |
|---|---|---|---|---|---|
| $SO_2$ | 57.51 | 59.84 | 59.84 | 59.84 | 59.84 |
| $CH_4$ | 30.27 | 31.49 | 31.49 | 31.49 | 31.49 |
| $H_2O$ | 8.33 | 8.67 | 8.67 | 8.67 | 8.67 |
| Sulfur as | | | | | |
| $S_2$ | 3.88 | — | — | — | — |
| $S_6$ | — | — | — | — | — |
| $S_8$ | — | — | — | — | — |
| Nitrogen | — | — | — | — | — |
| Ratio $SO_2/CH_4$ | 1.90 | 1.90 | 1.90 | 1.90 | 1.90 |
| B. Reaction Conditions | | | | | |
| Catalyst: | Calcium Aluminate | Calcium Aluminate | Calcium Aluminate | Calcium Aluminate | Calcium Aluminate |
| Reactor Inlet Temperature °F. | 1200° | 1200°(4) | 1300° | 1350° | 1400° |
| Reactor Exit Temperature °F. | 1890° | — | 1953° | 1967° | 2013° |
| Actual residence time in reactor at time of essentially complete methane utilization, seconds | 2.26 | — | 2.59 | 1.37 | 0.73 |

(4)After 5 seconds no reaction had been initiated

Example 3

| A. Feed Gas Composition | Run A | Run B | Run C | Run D |
|---|---|---|---|---|
| $SO_2$ | 9.95 | 9.95 | 9.95 | 9.95 |
| $CH_4$ | 5.45 | 5.45 | 5.45 | 5.45 |
| $H_2O$ | 14.59 | 14.59 | 14.59 | 14.59 |
| Sulfur as | | | | |
| $S_2$ | 3.89 | — | — | — |
| $S_6$ | — | — | — | — |
| $S_8$ | — | — | — | — |
| Nitrogen | 66.12 | 70.01 | 70.01 | 70.01 |
| Ratio $SO_2/CH_4$ | 1.83 | 1.83 | 1.83 | 1.83 |
| B. Reaction Conditions | | | | |
| Catalyst: | Calcium Aluminate | Calcium Aluminate | Calcium Aluminate | Calcium Aluminate |
| Reactor Inlet Temperature °F. | 1200° | 1400°(5) | 1450° | 1500° |
| Reactor Exit Temperature °F. | 1444° | — | 1648° | 1690° |
| Actual residence time in reactor at time of essentially complete methane utilization, seconds | 4.8 | — | 2.12 | 1.26 |

(5)After 5 seconds no reaction had been initiated

TABLE II

| Product Gas Composition(1) | Example 1 - Series 1 (Sulfur Present) | | | |
|---|---|---|---|---|
| | Run A | Run B | Run C | Run D |
| $SO_2$ | 7.59 | 7.84 | 7.72 | 7.74 |
| $CH_4$ | — | — | — | — |
| $H_2O$ | 50.86 | 51.16 | 51.14 | 51.20 |
| COS | 0.415 | 0.393 | 0.404 | 0.470 |
| CO | 0.913 | 1.74 | 1.481 | 1.527 |
| $CS_2$ | 0.001 | 0.001 | 0.001 | 0.002 |
| $H_2S$ | 14.06 | 13.55 | 13.32 | 13.02 |
| $H_2$ | 2.16 | 2.36 | 2.61 | 2.84 |
| $CO_2$ | 28.91 | 28.10 | 28.35 | 28.24 |
| Sulfur(2) | 22.48 | 22.63 | 22.79 | 22.90 |

(1)Composition (mol Percent) of product gas stream in the reactor at the time of essentially complete methane utilization
(2)Sulfur in the form of $S_2$

Example 1

Series 2 (No Sulfur Present)

| Product Gas Composition[1] | Run E[3] | Run F | Run G | Run H |
|---|---|---|---|---|
| $SO_2$ | 53.72 | 7.69 | 7.55 | 7.63 |
| $CH_4$ | 27.22 | — | — | — |
| $H_2O$ | 14.37 | 54.11 | 54.04 | 54.13 |
| COS | 0.021 | 0.380 | 0.424 | 0.461 |
| CO | 0.001 | 1.809 | 1.402 | 1.612 |
| $CS_2$ | 0.016 | 0.001 | 0.001 | 0.001 |
| $H_2S$ | 0.948 | 13.138 | 12.93 | 12.62 |
| $H_2$ | 0.006 | 2.53 | 2.81 | 3.03 |
| $CO_2$ | 4.20 | 29.27 | 29.63 | 29.39 |
| Sulfur[2] | 3.48 | 22.22 | 20.38 | 20.46 |

[1] Composition of product gas stream in the reactor at the time of essentially complete methane utilization
[2] Sulfur in the form of $S_2$
[3] Product gas composition after 4 seconds.

Example 2

| Product Gas Composition[1] | Run A | Run B[4] | Run C | Run D | Run E |
|---|---|---|---|---|---|
| $SO_2$ | 6.62 | 59.84 | 6.70 | 7.00 | 6.95 |
| $CH_4$ | — | 31.49 | — | — | — |
| $H_2O$ | 51.87 | — | 55.06 | 55.30 | 55.16 |
| COS | .440 | — | .407 | .397 | .402 |
| CO | 1.85 | — | 2.70 | 3.54 | 3.29 |
| $CS_2$ | .002 | — | .001 | .001 | .001 |
| $H_2S$ | 13.94 | — | 12.75 | 12.24 | 12.00 |
| $H_2$ | 3.06 | — | 3.84 | 4.11 | 4.50 |
| $CO_2$ | 27.98 | — | 28.39 | 27.55 | 27.80 |
| Sulfur[2] | 22.14 | — | 19.99 | 20.10 | 20.24 |

[1] Composition of product gas stream in the reactor at the time of essentially complete methane utilization
[2] Sulfur in the form of $S_2$
[4] No reaction after 5 seconds

Example 3

| Product Gas Composition[1] | Run A | Run B[5] | Run C | Run D |
|---|---|---|---|---|
| $SO_2$ | 1.99 | 9.95 | 1.26 | 1.28 |
| $CH_4$ | — | 5.4563 | — | — |
| $H_2O$ | 19.68 | — | 21.26 | 21.27 |
| COS | .042 | — | .035 | .036 |
| CO | .045 | — | .174 | .222 |
| $CS_2$ | .000 | — | .000 | .000 |
| $H_2S$ | 5.51 | — | 3.47 | 3.35 |
| $H_2$ | .311 | — | .768 | .884 |
| $CO_2$ | 5.37 | — | 5.25 | 5.20 |
| Sulfur[2] | 5.09 | — | 2.59 | 2.64 |

[1] Composition of product gas stream in the reactor at the time of essentially complete methane utilization
[2] Sulfur in the form of $S_2$
[3] No reaction after 5 seconds

TABLE III

| Example No. 1 | Temperature Profile (°F.) Sec. | | | | | Residence Time, Sec. - Complete Methane Utilization | Remarks |
|---|---|---|---|---|---|---|---|
| | Initiation | 0.5 | 1.0 | 1.5 | Final | | |
| Series 1 - Run A[1] | 1050 | 1064 | 1076 | 1091 | 1796 | 3.87 | While the reaction proceeds smoothly to completion without a sudden increase in temperature, the temperature rise within the first 0.5 second was only 14° F. which is not considered adequate for a commercial operation. |
| Series 1 - Run B[1] | 1100 | 1125 | 1156 | 1218 | 1810 | 2.0 | Each of these reactions proceeds smoothly to completion without a sudden increase in temperature. The product distribution at the time of complete methane utilization is good, i.e. relatively small amounts of carbonyl sulfide, carbon disulfide carbon monoxide and hydrogen. |
| Series 1 - Run C[1] | 1150 | 1209 | 1407 | — | 1857 | 1.06 | |
| Series 1 - Run D[1] | 1200 | 1387 | — | — | 1895 | 0.57 | |

[1] Reaction mixture contains about 1 mol percent sulfur, expressed as $S_8$.

| | | | | | | | |
|---|---|---|---|---|---|---|---|
| Series 2 - Run E[2] | 1050 | 1064 | 1065 | 1074 | 1160 | — | After 4 seconds there was only 7.86 mol percent $SO_2$ reacted and the temperature in the reactor had only reached 1160°F. |
| Series 2 - run F[2] | 1100 | 1114 | 1131 | 1156 | 1844 | 2.80 | During the first 0.5 second the temperature only rose 14°F and in the first second only 31°F totally inadequate to support a commercial process. |

-continued

| | | | | | | | |
|---|---|---|---|---|---|---|---|
| Series 2-Run G[2] | 1150 | 1177 | 1224 | 1457 | 1871 | 1.54 | After initiation at 1150°F the reaction proceeded smoothly to completion, but time for complete methane utilization was 1.54 seconds. |
| Series 2-Run H[2] | 1200 | 1265 | — | — | 1904 | 0.87 | After initiation at 1200°F the reaction proceeded smoothly to completion, but the time for complete methane utilization was 0.87 second. |

[2]No sulfur added to the reaction mixture

| | | | | | | | |
|---|---|---|---|---|---|---|---|
| 2-A[1] | 1200 | 1222 | 1247 | 1290 | 1890 | 2.26 | Reaction proceeds smoothly to completion without sudden increase in temperature. |
| 2-B[2] | — | — | — | — | — | — | After 5 seconds there is no initiation of the reduction reaction at 1200°F. in the absence of sulfur added to the reaction mixture. |
| 2-C[2] | 1300 | 1301 | 1305 | 1318 | 1953 | 2.59 | (a) In the first 1.5 seconds the temperature rise is only 18° (b) Temperature rise between 2.5 seconds (1531°F.) and 2.59 seconds (1953°) is 421°F. within this 0.09 sec. time frame. |
| 2-D[2] | 1350 | 1357 | 1399 | — | 1967 | 1.37 | (a) In the first 0.5 second the temperature rise is only 7°F.; (b) Temperature rise between 1.3 (1568°F.) and 1.37 seconds (1967°F) is 399°F. within this 0.07 sec. time frame. |

[1]Reaction mixture contains about 1 mol percent sulfur, expressed as $S_8$.
[2]No sulfur present at initiation of reduction reaction.

| | | | | | | | |
|---|---|---|---|---|---|---|---|
| 2-E[2] | 1400 | 1443 | — | — | 2013 | 0.73 | While reaction initiates satisfactorily at 1400°F., between .7 sec. (1659°F.) and .73 sec. (2013°F.) there is a 354°F. rise in temperature with this 0.03 sec. time frame. |
| 3-A[1] | 1200 | 1227 | 1238 | 1253 | 1444 | 4.8 | Reaction proceeds smoothly to completion without sudden increase in temperature. |
| 3-B[2] | — | — | — | — | — | — | After 5 seconds there is no initiation of the reduction reaction at 1400°F. in the absence of sulfur added to the reaction mixture |
| 3-C[2] | 1450 | 1451 | 1460 | 1515 | 1648 | 2.12 | In the first second there is a temperature rise of only 10°F. which renders initiation at 145°F. not commercially feasible because of the heat losses in commercial equipment. |
| 3-D[2] | 1500 | 1510 | 1638 | — | 1690 | 1.26 | Although the reaction proceeds smoothly at an initiation temperature of 1500°F, the initial rate of the rise of temperature (10°F in 0.5 second) is not commercially feasible. |

[1]Reaction mixture contains about 1 mol percent sulfur, expressed as $S_8$.
[2]No sulfur present at initiation of reduction reaction.

In Example 1 the feed gas is a concentrated $SO_2$-containing gas containing about 90 mol percent sulfur dioxide and 10 mol percent water to which is added methane to give a sulfur dioxide: methane mol ratio of 1.96:1. An activated alumina catalyst is employed. From a comparison of the Runs of Series 1 and Series 2 of Example 1, it may be seen that initiation of the reduction reaction wherein sulfur is present in the reaction mixture is at least 50°F below (Series 1-Run B) the initiation of the reduction reaction carried out in the absence of sulfur (Series 2-Run G). Also, the reduction reactions initiated at a given temperature in the presence of sulfur (Series 1) were completed in less time than those reactions initiated at the same temperature but having no sulfur added. For example, in Series 1-Run B at an initiation temperature of 1100°F complete methane utilization was achieved in 2 seconds; whereas in Series 2-Run F complete methane utilization was achieved in 2.8 seconds. This would permit a reduction in the reactor size of approximately 27 percent when sulfur is present in the gaseous reaction mixture at which initiation is at 1,100°F. At a 1,200°F initiation temperature (Series 1-Run D v. Series 2-Run H) the reduction in reactor size would amount to about 34 percent.

In Example 2 the feed gas has an $SO_2$ concentration of about 87.3 mol percent and about 12.7 mol percent water and the molar ratio of $SO_2$ to methane is 1.90:1. A calcium aluminate catalyst is employed.

As may be seen from the data in these tables, initiation of the reduction reaction in Run 2-A of Example 2 is satisfactorily initiated at 1,200°F; whereas comparable runs (Runs 2-B, 2-C and 2-D) conducted in the absence of sulfur and at initiation temperatures as high as 1,350°F are not initiated satisfactorily. In the absence of sulfur it was found that it was necessary to raise the reactor inlet temperature to 1,400°F (Run 2-E) in order to satisfactorily initiate the reaction. Even at an initiation temperature of 1,400°F (Run 2-E) conducted in the absence of sulfur, in the time frame between 0.700 and 0.726 second (a difference of only 0.026 second) the temperature rose 380°F which is equivalent to a temperature rise of 14,600°F per second. In comparison, Run 2-A in the time frame between 2.201 seconds and 2.250 seconds (a difference of 0.049 second) the temperature rose 299°F which is equivalent to a temperature rise of 6,000°F per second, less than half the rate of the temperature rise of Run 2-E. Further, it may be seen from a comparison of the data of Runs 2-A and 2-E that the final temperature when complete utilization of methane is achieved is about 2013°F for Run 2-E and only about 1,890°F for Run 2-A. This is an important factor since the difference in materials of construction needed at these high temperatures can possibly render a process economically unfeasible and it is preferred to avoid the higher reaction temperatures where possible. Still further, if initiation of the reduction reaction were conducted at 1,300°F the presence of sulfur in the reaction mixture at initiation would permit a reduction in the reactor size by about 70 percent.

In Example 3 a weak sulfur dioxide gas stream is employed and contains about 11 mol percent sulfur dioxide and 16.1 mol percent water to which is added methane to give a sulfur dioxide: methane mol ratio of about 1.83:1. A calcium aluminate catalyst is employed. If sulfur is not present at initiation of the reduction and using the less concentrated sulfur dioxide-containing gases, the reduction reaction proceeds more smoothly than with the more concentrated gases, but satisfactorily initiation temperatures are in the order of about 1,450° to 1,500°F (Runs 3-C and D); whereas with sulfur present initiation occurs very smoothly at about 1,200°F (Run 3-A).

In Examples 1, 2 and 3, the reactions proceeded smoothly to completion conducted in the presence of sulfur and the product gas distribution (Table II) is that at the time of essentially complete methane utilization. When sulfur is present at the initiation of the reduction reaction of sulfur dioxide with a hydrocarbon reducing agent the initiation temperature of the reduction reagent is reduced, the maximum reactor temperature is reduced and when the reaction is permitted to go to completion the reductant efficiency is improved resulting in lower concentrations of carbon monoxide and hydrogen in the product gases.

In addition to a reduction in the initiation temperature employing sulfur, it was also found that a slight improvement in methane utilization; that is, reduced residual carbon monoxide and hydrogen, can be accomplished by feeding a portion of the unheated reactants, i.e. sulfur dioxide and methane, into an intermediate point in the catalyst bed. This reduces the reactor exit temperature and shifts equilibrium towards lower carbon monoxide and hydrogen concentrations.

What is claimed is:

1. In a process for the catalytic reduction of sulfur dioxide to elemental sulfur by reacting a gaseous mixture of a sulfur dioxide-containing gas and a hydrocarbon reducing agent at elevated temperatures, the improvement comprising effecting initiation of said reduction reaction in the presence of 0.05 to 3 mol percent elemental sulfur vapor, expressed as $S_8$, wherein the volume of the mixture of the sulfur dioxide-containing gas and hydrocarbon reducing agent in the presence of said elemental sulfur is not appreciably increased and the reduction is carried out at temperatures within the range of 850° to 2,400°F.

2. The process of claim 1 wherein the reduction reaction is carried out in a catalyst bed.

3. The process of claim 2 wherein the reducing catalyst is an alumina-based catalyst.

4. The process of claim 2 wherein the reducing catalyst is calcium aluminate.

5. The process of claim 1 wherein the initiation of the reduction reaction is at a temperature from 850° to 1,300°F.

6. The process of claim 5 wherein the initiation temperature of the reduction reaction is at least 50°F below the temperature at which initiation of said reduction reaction is effected in the absence of said sulfur.

7. The process of claim 1 wherein the hydrocarbon reducing agent is selected from the group consisting of natural gas and a lower molecular weight hydrocarbon of one to four carbon atoms.

8. The process of claim 1 wherein the hydrocarbon is methane.

9. The process of claim 1 wherein the hydrocarbon is natural gas.

10. The process of claim 1 wherein the molar ratio sulfur dioxide to hydrocarbon reducing agent is about 1.33 to 6.5:1.

11. The process of claim 8 wherein the molar ratio of sulfur dioxide to methane is from 1.33 to 2.0:1.

12. The process of claim 1 wherein the sulfur dioxide-containing gas contains in excess of 50% by volume sulfur dioxide.

13. The process of claim 1 wherein the elemental sulfur is present in amounts between 0.1 and 1.5 mol percent, expressed as $S_8$.

14. The process of claim 2 wherein a portion of the feed mixture is introduced into an intermediate part of the catalyst bed.

15. The process of claim 1 wherein the reduction reaction is conducted under conditions such that the products of the reduction reaction consist essentially of hydrogen sulfide, sulfur dioxide and sulfur.

16. The process of claim 15 wherein the reduction reaction is conducted under conditions such that the molar ratio of hydrogen sulfide to residual $SO_2$ in the product gas stream is about 2:1.

17. The process of claim 1 wherein the reduction reaction is carried out at a temperature within the range of 950° to 2,000°F.

* * * * *